United States Patent

Laun

Patent Number: 5,588,612
Date of Patent: Dec. 31, 1996

[54] SAFETY BELT BLOCKING DEVICE WITH SELF-BLOCKING PREVENTION

[75] Inventor: Ulrich Laun, Drage, Germany

[73] Assignee: Autoliv Development AB, Vargarda, Sweden

[21] Appl. No.: 573,255

[22] Filed: Dec. 15, 1995

[30] Foreign Application Priority Data

Dec. 15, 1994 [DE] Germany ............... 44 44 655.1

[51] Int. Cl.⁶ .................. B60R 22/405; B60R 22/41; B60R 22/42
[52] U.S. Cl. ................... 242/383.1; 242/381.1; 242/384.1
[58] Field of Search ............... 242/383.1, 384.1, 242/383.4, 384.2, 384.3, 384.4, 384.5, 384.6, 381.1, 381.4; 280/806; 297/478, 480

[56] References Cited

U.S. PATENT DOCUMENTS

| | | | |
|---|---|---|---|
| 4,726,541 | 2/1988 | Tsukamoto et al. | 242/383.1 |
| 5,348,248 | 9/1994 | Butenop | 242/383.1 |
| 5,485,971 | 1/1996 | Nakaya et al. | 242/383.4 |

FOREIGN PATENT DOCUMENTS

| | | |
|---|---|---|
| 0112033 | 6/1984 | European Pat. Off. . |
| 0185367 | 6/1986 | European Pat. Off. . |
| 0307822 | 3/1989 | European Pat. Off. . |
| 3123547 | 1/1983 | Germany . |
| 3441531 | 5/1986 | Germany . |

*Primary Examiner*—John M. Jillions
*Attorney, Agent, or Firm*—Robert W. Becker & Associates

[57] ABSTRACT

In a blocking device for a safety belt having a belt retractor, which carries a belt reel for winding and unwinding the safety belt and has a control wheel controlled in a safety belt-sensitive and/or vehicle-sensitive manner and a control plate controlled thereby for triggering blocking of the belt reel, a self-blocking action of the belt retractor is to be cancelled by a single pull on the safety belt. On the control plate a pilot pawl is supported, which is rotatable by the movement of the control plate and which, during the blocking sequence, before the latter reaches its disengaged position, holds the control plate securely in such an intermediate position that a subsequent relative movement between the control wheel and the control plate is possible. This results in the cancellation of the self-blocking action and the return of the relevant structural parts into their respective initial position.

4 Claims, 2 Drawing Sheets

SAFETY BELT BLOCKING DEVICE WITH SELF-BLOCKING PREVENTION

BACKGROUND OF THE INVENTION

The invention relates to a blocking device for a safety belt having a belt retractor, which comprises a belt reel for winding and unwinding the safety belt, a toothed control wheel rotating with the belt reel and controlled in a safety-belt sensitive and/or vehicle-sensitive manner, and a control plate, which is coupled in the event of triggering to the control wheel and is disposed so as to be pivotable between a disengaged position and a blocking position. The pivoting movement into the blocking position is effected by a pull on the safety belt in the belt withdrawal direction and leads via a blocking mechanism to blocking of the blocking device, whereby a vehicle sensor effects engagement of a sensor pawl into an associated toothing of the control wheel and/or a safety belt sensor controls a sensor pawl which couples the control wheel and the control plate to one another through engagement into an associated toothing.

A blocking device of the aforementioned kind is known in various embodiments, e.g., from European Patent Application 0 185 367 or European Patent 0 307 822. In these embodiments, the belt retractor of the blocking device is combined with a clamping device as a blocking mechanism for the safety belt, the movable clamping jaw of the clamping device being connected to the pivotable control plate of the belt retractor in such a way that the pivoting of the control plate, effected by the control system of the belt retractor with the control wheel, is converted into the clamping motion of the clamping device. In this embodiment it is immaterial whether the control wheel or the associated control mechanism of the belt retractor is disposed on the control plate itself so that, with the pivoting of the control plate, the belt reel is also radially displaced, or whether the belt reel together with the control wheel is supported in a radially fixed manner and the separately disposed control plate may swivel about the axis of the belt reel or the control wheel. A blocking device of the aforementioned kind, in which the blocking mechanism is formed by a self-locking belt retractor having a belt reel which is radially displaceable into a blocking toothing fixed to the housing, is moreover disclosed in European Patent Application 0 112 033.

With a belt retractor as part of a blocking device constructed as described above as part of a blocking device, a rapid intake of the safety belt at the end of a belt winding process may lead to self-blocking of the control mechanism in that, upon a resultant activation of the safety belt sensor or the vehicle sensor, the respective sensor pawl moves into engagement with the associated toothing of the control wheel and in so doing effects the coupling to the control plate so that, at the end of the winding process, the belt retractor is in a state of readiness for blocking, in which any pull on the safety belt in the belt withdrawal direction necessarily leads to a blocking of the blocking device either because the consequently triggered swivelling of the control plate operates the clamping jaw as a blocking mechanism or because the belt reel is displaced radially into its locking position. Because the toothings on the control wheel are usually constructed with a specific undercut or because of friction between sensor pawl and gearing, the readiness for blocking is no longer automatically releasable when the safety belt is fully taken up because there is no longer any length of safety belt which may be drawn in to effect a rotation of the control wheel which frees the associated sensor pawls and releases the self-blocking action. This self-blocking action is a particular drawback in the case of belt retractors connected to a clamping device because a withdrawal of the safety belt is prevented by the clamping device activated upon each pull on the safety belt. In general, by applying a certain pull on the safety belt, it is still possible in conventional belt retractor, based on the film reel effect, to bring about a releasing rotation of the control wheel; however, with a clamping device connected on the load side, this is not possible. The same applies, however, also to self-locking belt retractors which are combined with automatically operating adjusting systems because, when belt withdrawal is inhibited by self-blocking of the belt retractor, an activation of the adjusting system may lead to the destruction of structural parts.

The object of the present invention is thus to improve a blocking device of the aforementioned kind in such a way that a self-blocking action of the associated belt retractor may be canceled by a single pull on the safety belt.

SUMMARY OF THE INVENTION

The blocking device for a safety belt according to the present invention is primarily characterized by:

a safety belt retractor with a housing and a belt reel for receiving the safety belt, the belt reel positioned in the housing;

the safety belt retractor having a control wheel with outer toothing, the control wheel fixedly connected to the belt reel so as to rotate with the belt reel;

a control plate pivotable between a disengaged position and a blocking position upon withdrawing the safety belt from the belt reel, in which blocking position the control plate triggers blocking of safety belt withdrawal;

a safety-belt-sensitive control means acting on the control wheel, the safety-belt-sensitive control means comprising a first sensor pawl for coupling the control wheel and the control plate when the safety-belt-sensitive control means is triggered;

a vehicle-sensitive control means acting on the control wheel, the vehicle-sensitive control means comprising a second sensor pawl mounted on the control plate, the second sensor pawl engaging the toothing of the control wheel when the vehicle-sensitive control means is triggered;

a pilot pawl pivotably connected to the control plate, the pilot pawl pivotable between a rest position and an abutment position, wherein the pivot pawl is moved from the rest position into the abutment position, when the control plate is rotated from the disengaged position into the blocking position;

wherein the pilot pawl in the abutment position secures the control plate upon return from the blocking position into the disengaged position in an intermediate position before reaching the disengaged position in which a relative movement between the control wheel and the control plate is possible; and wherein due to the relative movement the first and second sensor pawls are released, subsequently the pilot pawl is returned into the rest position, and the control plate is returned into the disengaged position.

The device preferably further comprises a stop mounted at the housing. The stop engages the pilot pawl for pivoting the pilot pawl into the abutment position, when the control plate is pivoted into the blocking position.

Advantageously, the device further comprises a rest mounted at the housing for supporting the pilot pawl in the abutment position.

Preferably, the pilot pawl comprises a control cam which in the abutment position engages the toothing of the control wheel and in the rest position is disengaged from the toothing of the control wheel.

The basic idea of the invention is that a pilot pawl supported on the control plate, which is rotatable between a rest position and an abutment position and which, upon swivelling of the control plate into its blocking position, is rotated into its abutment position. When in this abutment position, the pilot pawl holds the control plate on its return from the blocking position into the disengaged position, before it reaches the disengaged position, securely in such an intermediate position that a subsequent relative movement between the control wheel and the control plate is possible, with the result that first the respective sensor pawls are moved out of the respective toothing on the control wheel and on the control plate and then, as a result of the relative movement between control wheel and control plate, the pilot pawl is returned from the abutment position into its rest position so that the control plate can continue its swivelling motion out of the intermediate position into the disengaged position. The invention offers the advantage that when the safety belt is fully wound onto the reel, despite the belt retractor being in a state of readiness for blocking brought about by the engagement of the respective sensor pawls in the associated toothings, there is still some length of safety belt available (because of the relative movement between control wheel and control plate enabled by the pilot pawl) which may be drawn in to enable a further rotation of the control wheel in the take-up direction. As a result of this rotation the associated sensor pawl(s) disengage(s) the toothing. Thus, the self-blocking action of the belt retractor is canceled.

According to one embodiment of the invention it is provided that, for rotating the pilot pawl into its abutment position, a stop fixed to the housing is provided which acts upon the pilot pawl when the control plate is pivoted. Thus, a forced guiding of the pilot pawl is realized.

For supporting the pilot pawl, mounted on the control plate, in its abutment position, according to another embodiment of the invention a rest fixed to the housing may be provided, which optionally also functions as a rest for the pilot pawl in its rest position, hence also providing a delimitation for the rotation of the pilot pawl between the stop position and the rest position.

According to yet another embodiment of the invention, the pilot pawl has a control cam which, in the abutment position of the pilot pawl, engages and, in the rest position of the pilot pawl, disengages the toothing of the control wheel, thereby advantageously ensuring that a further rotation of the control wheel, with the control plate being fixed thereto, necessarily moves the pilot pawl out of its abutment position back into its rest position so that the respective structural parts assume their respective initial position.

For the realization of the invention it is immaterial whether the control plate acts upon a movable clamping jaw of a clamping device, in the manner described in European documents 0 185 367 and 0 307 822, or effects blocking of the belt retractor by radial displacement of the belt reel into toothing fixedly connected to the housing, as described in European document 0 112 033. The disclosure of the above documents is therefore incorporated herein by reference.

BRIEF DESCRIPTION OF THE DRAWINGS

The object and advantages of the present invention will appear more clearly from the following specification in conjunction with the accompanying drawings, in which.

DESCRIPTION OF PREFERRED
EMBODIMENTS

Figure 1:
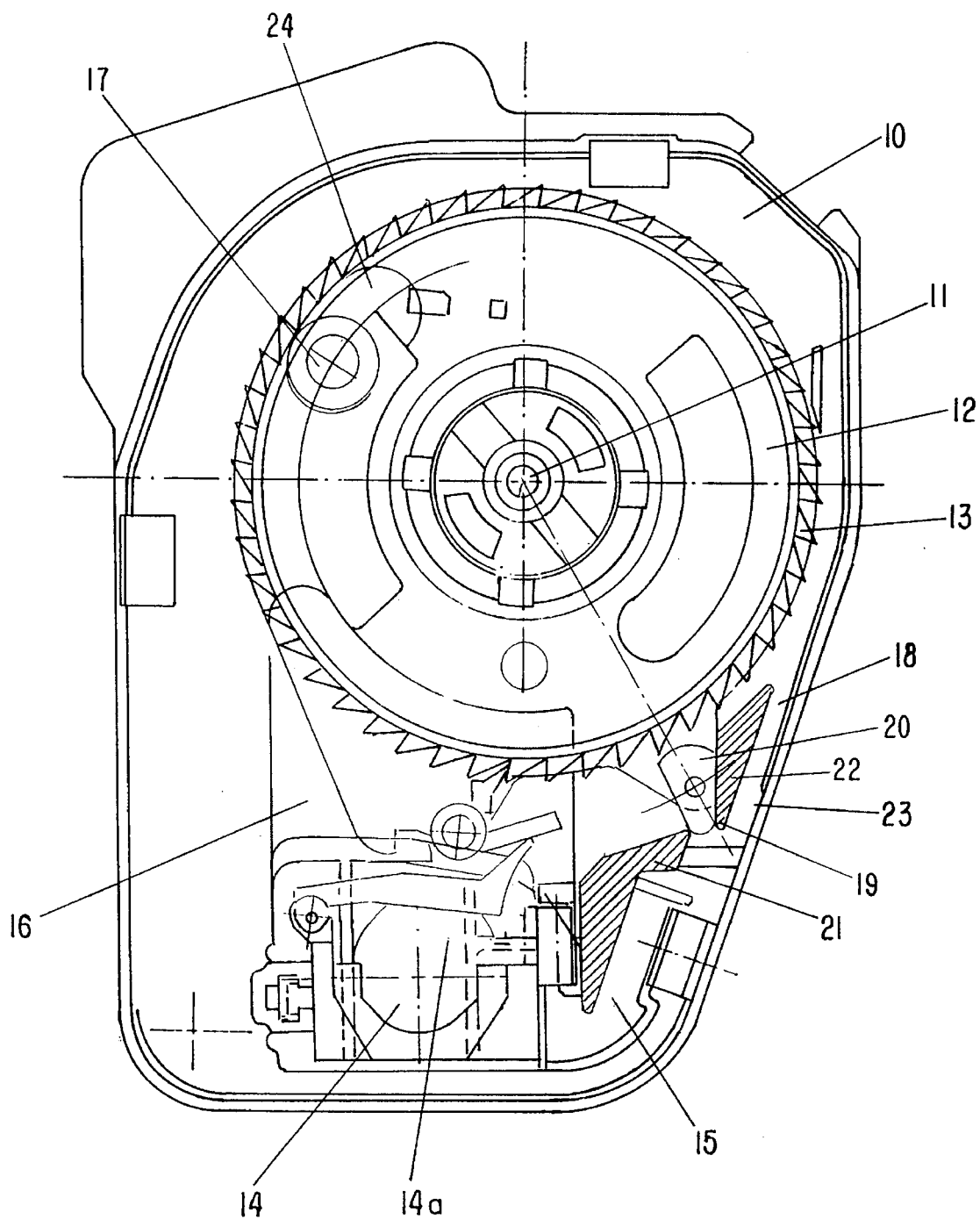
FIG. 1 shows in side view the system side of a belt retractor as part of the blocking device, with the pilot pawl in its rest position.

FIG. 1 shows the structural parts of a belt retractor in the starting position which may exist when the safety belt is taken up on the belt reel.

A belt reel 11 used to wind and unwind the safety belt (not shown) is supported rotatably and, in the illustrated embodiment, in a radially non-displaceable manner in a housing part 10 of a belt retractor. A control wheel 12 with an external toothing 13 is seated on and coupled to the belt reel 11. To form the vehicle-sensitive control means, a vehicle sensor in the form of a ball sensor 14 is seated in the housing leg 10 and, by means of its lever 14a, controls a sensor pawl 15 which is capable of swivelling between a position of engagement—produced when the vehicle sensor 14 responds—with the external toothing 13 of the control wheel 12 and a release position. Between the housing part 10 and the control wheel 12, a control plate 16 is disposed so as to be pivotable over an angular distance. The sensor pawl 15 is mounted on the control plate 16, so that an engagement of the sensor pawl 15 with the external toothing 13 of the control wheel 12 effects a coupling between the control wheel 12 and the control plate 16 which, upon a rotation of the control wheel 12 as a result of belt withdrawal, leads to swivelling of the control plate 16 out of its disengaged position into its blocking position.

A safety belt-sensitive control means or sensor (not shown) is provided which, as in the belt retractor described in European document 0 112 033, comprises a movable inertia body which in the event of triggering moves a further sensor pawl into engagement with an associated toothing of the respective other structural part to thereby couple the control wheel 12 and the control plate 16 to one another.

In the illustrated embodiment, the control plate 16 carries a pin 17, upon which an operating lever connected to the movable clamping jaw of a clamping device (not shown) acts through an oblong cutout 24. The structure of a complete blocking device with a belt retractor and a clamping device activated thereby is described in detail, for example, in European document 0 307 822, the disclosure of which is expressly incorporated herein.

Figure 2:
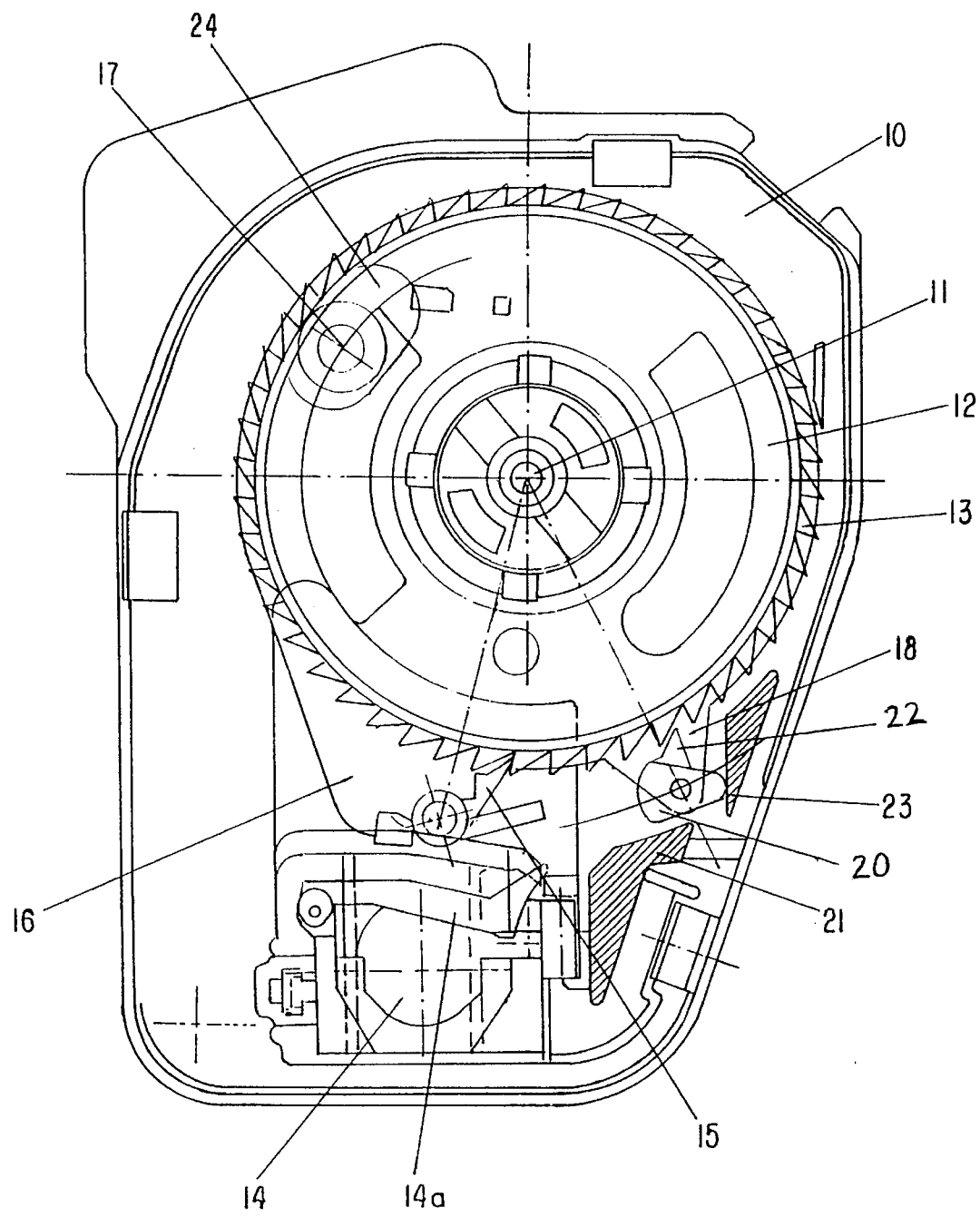
FIG. 2 shows the embodiment of FIG. 1, with the pilot pawl in its abutment position.

Supported on a projection 18 of the control plate 16 is a pilot pawl 20 which is rotatable about an axis of rotation 19. The pilot pawl 20 is rotatable between the rest position (shown in FIG. 1) and the abutment position (shown in FIG. 2). In its rest position, the pilot pawl 20 is acted upon by a stop 21 fastened to the housing in such a way that swivelling of the base plate 16 with the pilot pawl 20 mounted thereon relative to the stop 21 necessarily effects a rotation of the pilot pawl 20 about the axis of rotation 19. Upon rotation of the pilot pawl 20, a control cam 22 at the pilot pawl 20 engages the external toothing 13 of the control wheel 12. A rest 23 fastened to the housing is disposed in such a way that the pilot pawl 20 in its abutment position is supported thereat, while the rest 23, at the same time, also forms a seat for the pilot pawl 20 in its rest position as well as a delimitation for the rotation of the pilot pawl 20 between the abutment position and the rest position.

Using the vehicle sensor 14 as an example, FIG. 1 illustrates a self-blocking position of the belt retractor in which, owing to the retraction of the safety belt, e.g., as a result of jarring, at the end of the retraction travel the vehicle sensor 14 has responded and brought the sensor pawl 14 into engagement with the external toothing 13 of the control wheel 12. Because of the undercut of the external toothing 13, the sensor pawl 15 stays engaged with the toothing 13 and is not automatically releasable with the control plate 16 and control wheel 12 being coupled with one another. In this position, any pull on the safety belt in the belt withdrawal direction leads to a clockwise rotation of the control plate. Due to this swiveling action, the stop 21 pushes the pilot pawl 20 about the axis of rotation 19 into the position shown in FIG. 2, in which the control cam 22 of the pilot pawl 20 simultaneously engages the external toothing 13 of the control wheel 12. When the pull on the safety belt in the belt withdrawal direction ceases because of the occurring blocking of the belt in belt withdrawal direction, the control plate 16 rotates counter-clockwise by a specific amount until the pilot pawl 20, which is in the abutment position according to FIG. 2, contacts the rest 23 and thus prevents any further return movement of the control plate 16. In this intermediate position, however, the angle of return rotation of the control plate 16, and hence of the control wheel 12, is not yet complete so that, over the remaining return angle, the control wheel 12 may execute a movement relative to the control plate 16. This possible further rotation of the control wheel 12 in the counter-clockwise direction leads, on the one hand, to the sensor pawl 15 being ejected by the associated tooth flank from the external toothing 13 and, on the other hand, to the pilot pawl 20 being actively rotated by means of the control cam 22 back into the rest position shown in FIG. 1. With the return of the pilot pawl 20 into its rest position, the control plate 16 may then also continue to swivel out of its intermediate position back into its disengaged position so that, upon completion of the corresponding movements, the relevant structural parts have again assumed their respective initial position.

The present invention is, of course, in no way restricted to the specific disclosure of the specification and drawings, but also encompasses any modifications within the scope of the appended claims.

What I claim is:

1. A blocking device for a safety belt; said blocking device comprising:

a safety belt retractor with a housing and a belt reel for receiving the safety belt, said belt reel positioned in said housing;

said safety belt retractor having a control wheel with outer toothing, said control wheel fixedly connected to said belt reel so as to rotate with said belt reel;

a control plate pivotable between a disengaged position and a blocking position upon withdrawing the safety belt from said belt reel, in which blocking position said control plate triggers blocking of safety belt withdrawal;

a safety-belt-sensitive control means acting on said control wheel, said safety-belt-sensitive control means comprising a first sensor pawl for coupling said control wheel and said control plate when said safety-belt-sensitive control means is triggered;

a vehicle-sensitive control means acting on said control wheel, said vehicle-sensitive control means comprising a second sensor pawl mounted on said control plate, said second sensor pawl engaging said toothing of said control wheel when said vehicle-sensitive control means is triggered;

a pilot pawl pivotably connected to said control plate, said pilot pawl pivotable between a rest position and an abutment position, wherein said pivot pawl is moved from said rest position into said abutment position, when said control plate is rotated from said disengaged position into said blocking position;

wherein said pilot pawl in said abutment position secures said control plate upon return from said blocking position into said disengaged position in an intermediate position before reaching said disengaged position in which intermediate position a relative movement between said control wheel and said control plate is possible; and wherein due to said relative movement said first and second sensor pawls are released, subsequently said pilot pawl is returned into said rest position, and said control plate is returned into said disengaged position.

2. A blocking device according to claim 1, further comprising a stop mounted at said housing, said stop engaging said pilot pawl for pivoting said pilot pawl into said abutment position, when said control plate is pivoted into said blocking position.

3. A blocking device according to claim 1, further comprising a rest mounted at said housing for supporting said pilot pawl in said abutment position.

4. A blocking device according to claim 1, wherein said pilot pawl comprises a control cam which in said abutment position engages said toothing of said control wheel and in said rest position is disengaged from said toothing of said control wheel.

* * * * *